United States Patent Office 3,429,194
Patented Feb. 25, 1969

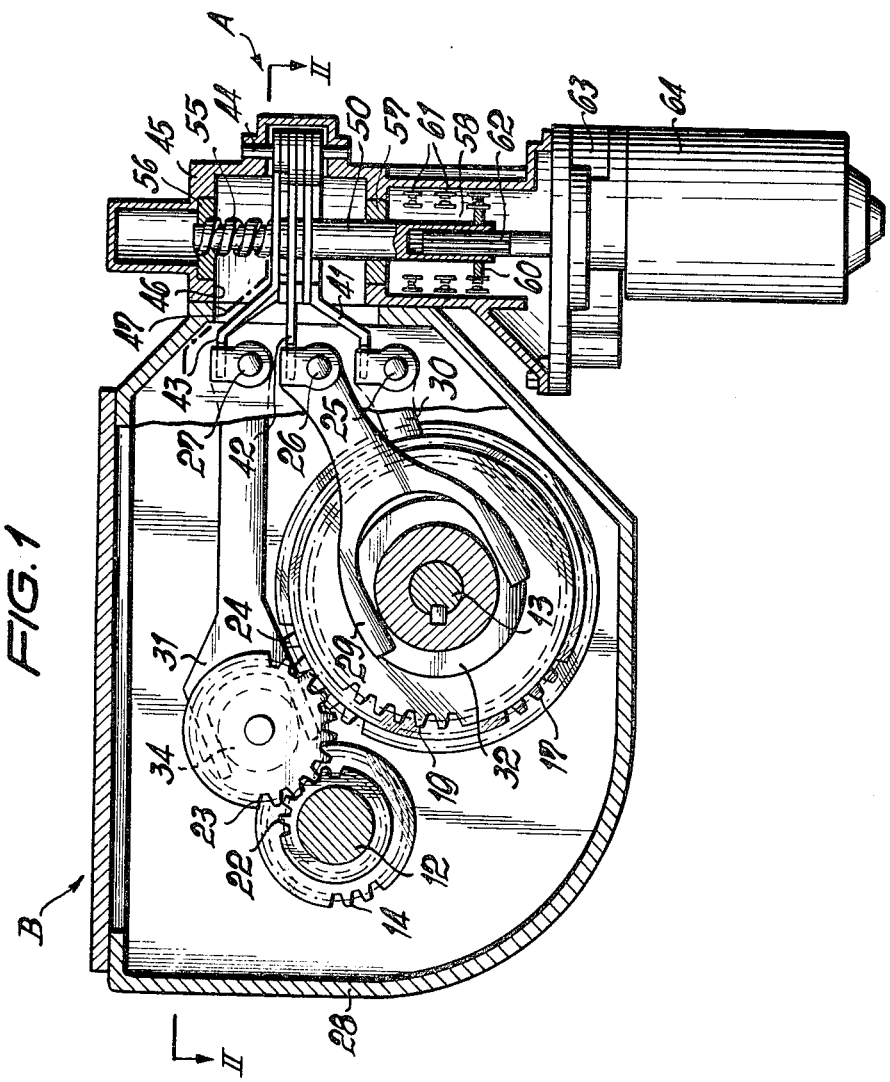

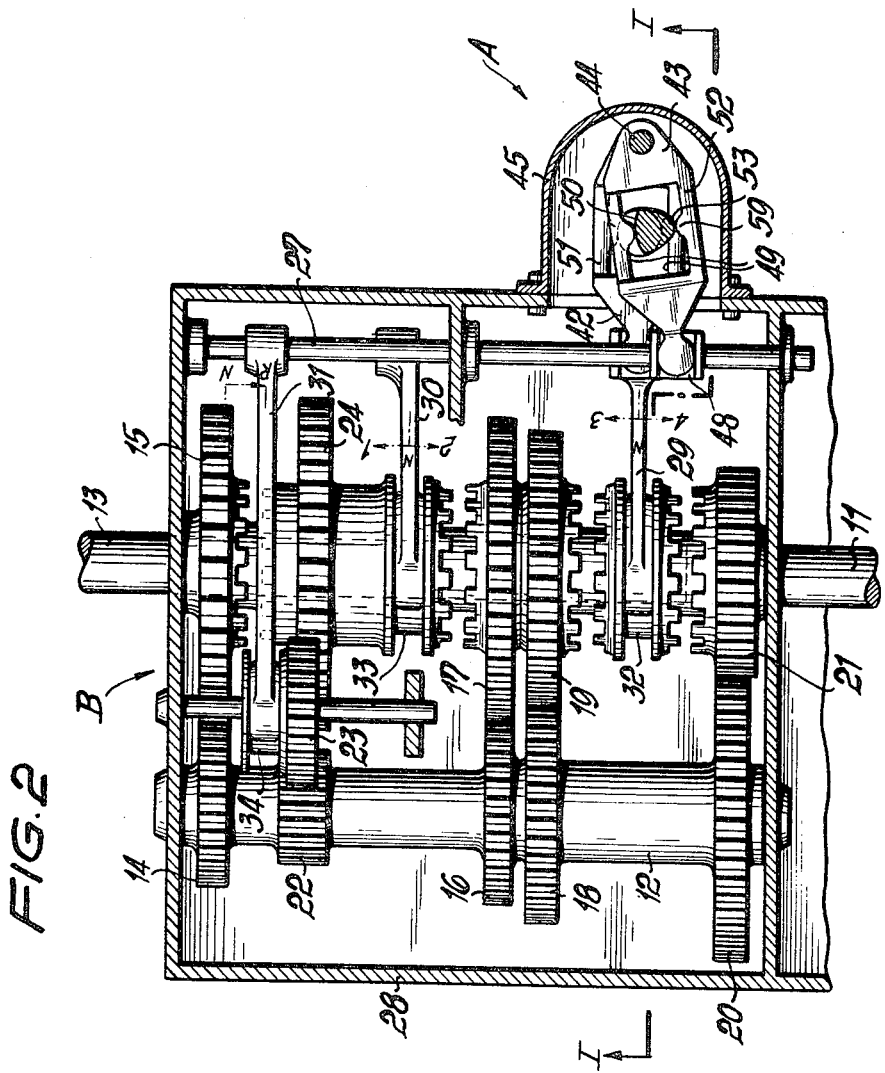

3,429,194
TRANSMISSION CONTROL DEVICE
Helmut Espenschied, Buhlertal, and Johann Jäckel, Baden-Baden, Germany, assignors to Robert Bosch G.m.b.H., Stuttgart, Germany
Filed Jan. 18, 1967, Ser. No. 610,156
Claims priority, application Germany, Jan. 21, 1966, B 85,489
U.S. Cl. 74—337.5   16 Claims
Int. Cl. F16h 5/06

ABSTRACT OF THE DISCLOSURE

When a control shaft is turned, a single cam thereon is shifted in axial direction for selectively engaging and displacing actuating members which effect shifting of a transmission.

Background of the invention

The invention relates to a control device for shifting a transmission.

According to the British Patent 996,377, it is known to shift a transmission by means of a motor driven control shaft having a plurality of cams respectively cooperating with the operating members of the transmission. The cams are constructed in such a manner that upon turning movement of the control shaft an angle of less than 360°, the transmission can be shifted between all stages.

It is a disadvantage of the prior art construction that each operating member requires a pair of cams, which are expensive to manufacture, and which have to be mounted on the control shaft in very precisely determined relative positions. Since the turning angle of the control shaft between two positions for effecting shifting from one gear stage to the next gear stage, is about 80° for a transmission having four forward stages and one reverse stage, the cams must have a rather large periphery to cope with the forces required for shifting the operating members of the transmisison. This results in a comparatively large control device, so that the mounting on the transmission in the available small space causes difficulties.

Summary of the invention

It is one object of the invention to overcome the disadvantages of known control devices for multi-stage transmissions, and to provide a control device in which one cam is used for shifting the transmission between all stages.

Another object of the invention is to provide a transmission with a compact control device which can be easily attached to the housing of the transmission.

Another object of the invention is to effect locking of the transmission in each of its stages by the same cam which effects the shifting of the transmission so that additional locking devices preventing the simultaneous actuation of two gear stages are not required.

With these objects in view, one embodiment of the invention comprises a plurality of actuating means movable between inoperative and operative positions and respectively including the operating members of a transmission for actuating the same in the operative positions, and control means including a control cam movable between a plurality of control positions respectively engaging the actuating means for moving a selected actuating member to the operative position. By shifting the control means, the cam is moved to a selected control position so that the respective operating member shifts the transmission to the selected stage.

In the preferred embodiment of the invention, the control means include a control shaft carrying a single control cam and having a thread so that upon turning of the control shaft, the same is shifted with the cam between axially displaced positions for cooperating with the actuating members which are disposed along the control shaft, preferably adjacent each other. Preferably, the control shaft passes through cutouts in actuating members which are constructed as levers mounted on a common support shaft and connected with the operating members. Engaging portions on opposite sides of the cutouts are spaced a distance which is equal to the diameter of the shaft. The control shaft has preferably a recess disposed diametrically to the control cam, and the radial depth of the recess is equal to the radial height of the control cam.

In the preferred embodiment of the invention, the control shaft is rotated by an electric motor with which it is connected by a reduction gear.

It is advantageous to provide the control shaft with a switch actuator engaging different switches in the axially displaced positions of the control shaft, which may be used for causing an indication of the selected gear stage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Brief description of the drawing

FIG. 1 is a cross-sectional view illustrating a transmission provided with a transmission control device according to the invention;

FIG. 2 is a longitudinal sectional view of the embodiment shown in FIG. 1;

Description of the preferred embodiments

Figure 3:
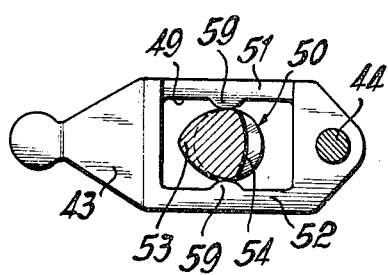
FIG. 3 is plan view, partly in section.

A transmission control device generally indicated A has a housing 45 secured to the housing 28 of a gear shift transmission generally indicated B. Housing 45 is open at one side and communicates with the interior of housing 28 through an opening 47 in the same.

Transmission B has four forward gear stages and one reverse gear stage. Input shaft 11 drives the intermediate shaft 12 through gears 21 and 20. The transmission has pairs of meshing gears 16 and 17 and 18, 19, and a gear train 22, 23, 24. Gears 15, 17 and 19 are freely rotatable on shaft 13 and can be coupled with the same by claw couplings 32 and 33 which are connected with output shaft 13 for rotation, but are axially shiftable on the same. Coupling means 32, 33 have annular recesses engaged by the forked ends of operating members 29 and 30. A third operating member 31 has a fork-shaped end engaging an annular recess in the hub of gear 23 which is mounted on an intermediate shaft for axial movement. When gear 23 connects gears 22 and 24, output shaft 13 is driven in a reverse direction of rotation. Gear 24 is fixedly secured to the axially shiftable coupling means 33.

The transmission is shown in FIG. 2 in the "reverse" position in which gear 23 meshes with gears 22 and 24.

When operating member 30 is shifted between the positions 1 and 2, the tarnsmission is shifted between the first two stages, and when operating member 29 is shifted between the positions 3 and 4, the transmission is shifted between the third and fourth stages. When the operating members 29, 30, 31 are shifted to the positions N, the transmission is in "neutral."

Operating members 29, 30 and 31 are respectively secured to rods 25, 26, 27, best seen in FIG. 1, which are mounted in bearings supported by housing 28, as best seen in FIG. 2. Each rod 25, 26, 27 carries a fixed guide member 48 which has a transverse guideway, and in the neutral position of the transmission, guide members 48 are superimposed and register with each other. Since the transmission is shown in the position "reverse," guide member 48 on rod 27 is shown displaced from the superimposed guide members 48 of rods 26 and 27 in FIG. 2. Guide members 48 are located in the proximity of opening 47 through which the interiors of transmission housing 28 and control device housing 45 communicate.

A support shaft 44 is mounted in a projecting portion of housing 45 and supports three actuating members 41, 42, 43 which have substantially circular guide portions at the free ends thereof respectively located in the guideways of the three guide members 48. Operating rods 25, 26, 27, guide members 48, and actuating members 41, 42, 43 constitute three actuating means for shifting the transmission to different stages. Actuating member 42 covers actuating member 41 in the position of FIG. 2 since operating members 29 and 30 are both in the neutral position. Actuating member 43 is shown in an angularly displaced operative position in which guide member 48 and rod 27 are shifted to place operating member 31 in the operative position for setting the transmission to "reverse."

A control shaft 50 passes through cutouts 49 of all three actuating members and has a threaded end portion 55 in threaded engagement with a ring 56 having an inner thread. The other end of control shaft 50 has a grooved bore into which a spline portion of a shaft 62 projects so that shaft 62 and 50 are connected for rotation, while shaft 50 can move in axial direction of shaft 62. A motor 64 is mounted on housing 45 and drives shaft 62 through a reduction gear transmission 63 so that when motor 64 is energized, control shaft 50 is rotated and moves in axial direction thereof due to the threaded means 56, 55.

Figure 4:
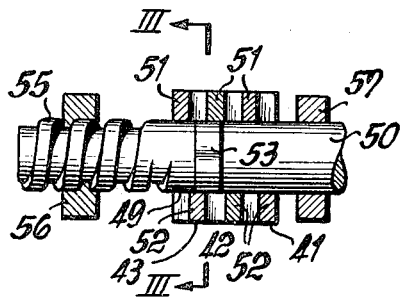
FIG. 4 is an elevation, partly in section, illustrating a first position of the control means of the embodiment of FIGS. 1 and 2.

Control shaft 50 passes through the cutouts 49 of all three actuating members 41, 42, 43. Each actuating member has two end portions of a given thickness, and two parallel connecting portions 51, 52 of half this thickness which are staggered in axial direction of control shaft 50, as best seen in FIG. 4.

Connecting portions 51 and 52 have confronting parallel substantially radially extending opposite edges having central inwardly projecting opposite engaging portions 59, spaced from each other a distance which is the same as the diameter of control shaft 50, as best in FIG. 3. FIG. 3 shows the actuating members superimposed in the inoperative position in which the transmission is set to "neutral," and it will be seen that the actuating members are locked in this position due to the engagement of shaft 50 with both engaging portions 59.

A single cam 53 forms part of control shaft 50 and radially projects on one side of the same. Diametrically opposite the extremity of control cam 53, shaft 50 has a recess 54. The radial depth of recess 50 is equal to the height of the extremity of control cam 53 above the surface of control shaft 50, so that the distance between the extremity of control cam 53 and the bottom of recess 54 is equal to the diameter of control shaft 50.

In the illustrated embodiment, control cam 53 is bounded by three surfaces, one of which is the bottom of recess 50, and the distances between the three corners of the periphery and the opposite sides of the control cam are all equal so that both engaging portions 59 are engaged in all turned positions of the control cam and the respective engaged actuating member is locked against turning movement. The same effects can be obtained by a control cam whose periphery is circular and eccentric to the cross section of control shaft 50.

Figure 6:
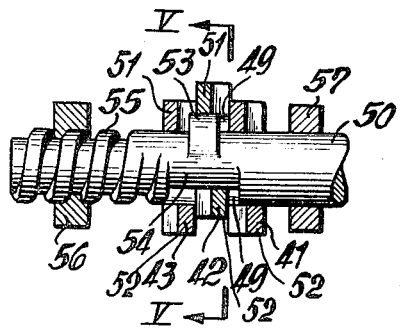
FIG. 6 is an elevation, partly in section, illustrating an operative position of the control means.

The axial thickness of control cam 53 is greater than the axial thickness of each connecting portion 51, and less than the thickness of each actuating member, as best seen in FIG. 4. The thickness of cam 53 is advantageously three-quarters of the thickness of each actuating member 41 to 43. The axial extension of recess 54 is slightly greater than twice the thickness of an actuating member 41 to 43, as best seen in FIG. 6.

When control shaft 50 is turned, the threaded connection 55, 56 causes axial movement of shaft 50 with cam 53 between successive control positions in which the cam successively engages the engaging portions 59 of actuating members 41, 42, 43. When the extremity of cam 53 engages an engaging portion 59, the respective actuating member is placed in an operative position, as shown for actuating member 43 in FIGS. 2, 8 and 7.

The axial pitch of threads 55, 56 is equal to the axial thickness of each actuating member, or to the constant distance between the transverse planes of symmetry of the actuating members 41, 42, 43. Consequently, when control shaft 50 is turned one revolution, control cam 53 turns therewith, but also moves in axial direction from a control position cooperating with one actuating member to a control position cooperating with the adjacent actuating member.

The housing 45 which is attached to housing 28 of the transmission, has a transverse wall 57 which forms a first chamber for the actuating members 41, 42, 43, and a second chamber in the lower part of housing 45. Control shaft 50 extends through a bore in wall 57 into the lower chamber and is there connected with the splined shaft portion 62. The lower end of control shaft 50 carries a switch actuator 60 which in the three axially displaced control positions of control shaft 50, successively cooperates with several switches 61 which control a circuit, not shown, for indicating the control positions of control means 50 to 56.

*Operation*

In order to place transmission B in a neutral position, control shaft 50 is turned to a position in which the three actuating members 41, 42, 43 are in an inoperative central position in which actuating members 41 and 42 are shown superimposed in FIG. 2. Consequently, as compared with the position of FIG. 2, actuating member 43 is turned to the position of actuating member 42, operating member 27, 31 is shifted to the position N, and gear 23 does not mesh with gear 24. In this inoperative position of the actuating members 41, 42, 43, engaging portions 59 thereof are in contact with the cylindrical surface of control shaft 50 where the same is not interrupted by control cam 53 or recess 54, as shown in FIGS. 3 and 4. In this "neutral" position of control shaft 50, the same is disposed in axial direction so that half of the axial thickness of cam 53 is located in the region of one actuating member 42, and the other half of the thickness of cam 53 is located in the region of the adjacent actuating member 43 without, however, displacing the same since the extremity of cam 53 does not engage any of the engaging portions 59 of actuating members 42 and 43.

Figure 5:
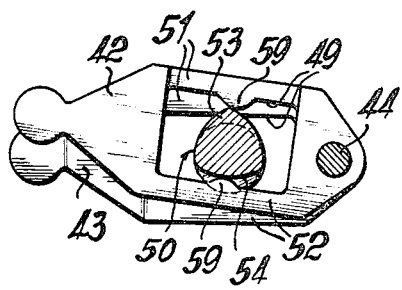
FIG. 5 is a plan view, partly in section.

When control shaft 50 is turned by actuation of motor 64 one-quarter turn in one or the other direction of rotation, the extremity of cam 53 turns 90° and engages the engaging portion 59 on connecting portion 51 of actuating member 42, as shown in FIGS. 5 and 6, if control shaft 50 is turned in clockwise direction as viewed in FIGS. 3 and 5.

Figure 7:
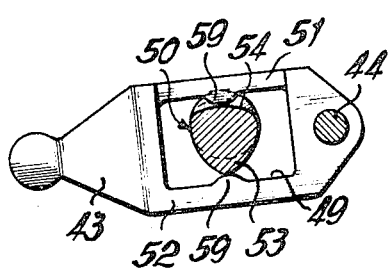
FIG. 7 is a plan view, partly in section.
Figure 8:
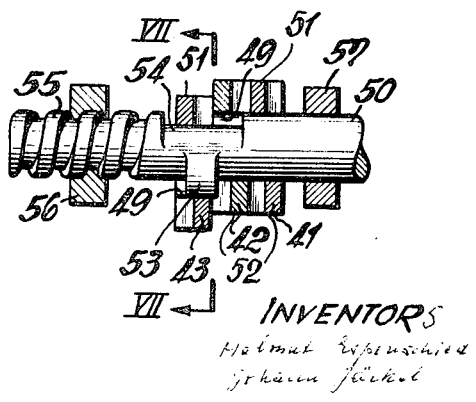
FIG. 8 is an elevation, partly in section, illustrating another operative position of the control means for shifting the transmission to reverse.

If control shaft 50 is turned out of the neutral position of FIG. 3 in counterclockwise direction, the extremity of cam 53 engages engaging portion 59 of connecting portion 52 of actuating member 43, displacing the same in counterclockwise direction to the operative position shown in FIGS. 2 and 7. As shown in FIGS. 5 and 6, engaging portion 59 of connecting portion 52 of the operative actuating member 42, is located in the recess 54. As shown in FIGS. 7 and 8, the engaging portion 59 of connecting portion 51 of the operative actuating member 43 is located in the recess 54.

Referring now specifically to the position shown in FIGS. 5 and 6 in which actuating member 42 is angularly displaced by control cam 53 to its operative position, the head portion of actuating member 42 which is located in the guideway of the respective guide member 48, displaces operating rod 26 upward as viewed in FIG. 2 so that operating member 30 with coupling means 33 is shifted to position 1 in which coupling means 33, which is connected for rotation with output shaft 13, is coupled with the freely rotatable gear 15 so that the output shaft 13 is driven from input shaft 11 through gears 21, 22, shaft 12, and gears 14 and 15 in the first stage of the transmission.

When control shaft 50 is further turned 90° in the same clockwise direction, actuating member 42 is restored to its normal inoperative position in which it is shown in FIG. 2. Further turning of control shaft 50 in clockwise direction an angle of 90° causes engagement between control cam 53 and portion 59 of connecting portion 52 of actuating member 42 which is displaced about support shaft 44 to a second operative position corresponding to the position of actuating member 43 in FIG. 2. Operating rod 26 with operating member 30 and coupling means 33 is shifted to the position 2 indicated in FIG. 2 in which coupling means 33 couples the output shaft 13 with gear 17 so that the drive is transmitted from input shaft 11 through gears 21, 22, 16 and 17 and coupling means 33 to output shaft 13 corresponding to the second stage of the transmission.

When control shaft 50 is further turned in clockwise direction, control cam 53 engages portion 59 of connecting portion 51 of actuating member 41 and turns the same in clockwise direction as viewed in the drawing to an operative position in which operating rod 25 and operating member 29 are displaced together with coupling means 32 so that the same engages the coupling teeth on gear 19 and connects the same to the output shaft 13. In this third gear stage of the transmission, output shaft 13 is driven from input shaft 11 through gears 21, 20, shaft 12, gears 18 and 19 and coupling means 32.

Further turning of control shaft 50 in clockwise direction causes after 90° return of actuating member 41 to its normal inoperative position, and after further turning through 90°, displacement of actuating member 41 to its second operative position in which rod 25 and operating member 29 are displaced to the position 4 in which coupling means 32 directly couples the input shaft 11 to the output shaft 13 in the fourth stage of the transmission.

When the direction of rotation of motor 64, which has reversible pole windings, is reversed when the transmission is in any of the four forward stages, control shaft 50 rotates with control cam 53 in counterclockwise direction so that the transmission is shifted down through the stages, and if desired is returned to the "neutral" position in which the control means 50 to 55 are in the position shown in FIGS. 3 and 4.

A gear shift lever, not shown, is operated by the driver to control through an electric circuit, not shown, the starting, stopping and reversing of motor 64 in a manner which is known, and not an object of the invention.

As explained above, when control shaft 50 is turned 90° in counterclockwise direction out of the "neutral" position shown in FIG. 3, the control means assume the position shown in FIGS. 7 and 8 in which actuating member 43 is displaced in counterclockwise direction to an operative position so that the head portion of actuating member 43 which is located in the guideway of guide member 48, displaces operating rod 27 with operating member 31 to the position shown in FIG. 2 in which gear 23 is in meshing engagement with gears 22 and 24 so that output shaft 13 is driven from input shaft 11 through gears 21, 20, 22, 23, 24 and coupling means 33 at a low rotary speed and in reversed direction of rotation. By turning control shaft 50 in clockwise direction from the position shown in FIG. 7 to the position shown in FIG. 3, all actuating members are placed in the inoperative central position, and the transmission is in the neutral position.

Although the control means of the present invention transmits very high forces, they can be constructed to be of small size since they can be placed in oil filling the interior of housings 28 and 45 which communicate through common openings, as explained above.

It will be understood that each of the elements described above, or two or more together, may also find a useful application in other types of transmission control devices differing from the types described above.

While the invention has been illustrated and described as embodied in a transmission control device having a single cam for shifting the transmission between a plurality of gear stages, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In combination with a transmission having a plurality of stages; a transmission control device including a plurality of actuating means movable between inoperative and operative positions and connected with said transmission for shifting the same in said operative positions between said stages; and control means including a control shaft having a control cam movable with said control shaft between a plurality of control positions respectively engaging said actuating means for moving a selected actuating means to said operative position, mounting means for mounting said control shaft for axial and turning movement, and threaded means connecting said control shaft with said mounting means, said cam being axially and angularly displaced in said control positions and engaging in said control positions said actuating means, respectively, for moving a selected actuating means to said operative position of the same whereby said transmission is shifted to a selected stage by the selected actuating means when said control shaft is turned.

2. Transmission control device as claimed in claim 1 wherein each actuating means includes an operating member for shifting said transmission between said stages, and an actuating member, said actuating member being movable between said inoperative and operative positions and being respectively connected with said operating members for actuating the same in said operative positions; and wherein said actuating members are disposed along said control shaft and respectively engaged and moved to said operative position by said control cam in said control positions.

3. Transmission arrangement as claimed in claim 1 wherein said actuating means have cutouts registering in said inoperative positions and overlapping in said operative position the cutout of an actuating means in said inoperative position, each cutout having edges spaced the diameter of said control shaft and engaged by the same in said inoperative positions of said actuating means; and wherein all diametrically opposite points of said control cam are spaced a distance equal to the diameter of said control shaft.

4. Transmission control device as defined in claim 1 wherein said threaded means include an inner thread on said mounting means, and an outer thread on said control shaft.

5. Transmission control device as defined in claim 1 wherein said actuating means are spaced along said control shaft equal distances related to the pitch of said threaded means so that said control cam successively engages said actuating means when said control shaft is turned the same angle.

6. Transmission control device as claimed in claim 2 and comprising a support shaft parallel with said control shaft and supporting said actuating members for angular movement between said inoperative and operative positions.

7. Transmission control device as claimed in claim 2 wherein said actuating members are disposed along said control shaft adjacent each other and have an axial thickness equal to the pitch of said threaded means; and wherein said control cam has an axial thickness greater than half said axial thickness and less than said axial thickness.

8. Transmission control device as claimed in claim 2 and comprising a support shaft parallel with said control shaft and supporting said actuating members for angular movement between said inoperative and operative positions; and wherein said actuating members have cutouts registering in said inoperative positions while the cutout of an actuating member in said operative position overlaps the cutout of an actuating member in said inoperative position; wherein said control shaft passes through said cutouts; wherein said control cam projects in radial direction from one side of said control shaft; and wherein said control shaft has a recess on the opposite side thereof whose radial depth is equal to the radial height of said control cam.

9. Transmission control device as claimed in claim 8 wherein each cutout is partly bounded by opposite substantially radially extending edges having engaging portions spaced from each other across said cutout a distance equal to the diameter of said control shaft and engaged by the same in said inoperative positions of said actuating members.

10. Transmission control device as claimed in claim 9 wherein the diametrical distance between the extremity of said control cam and the bottom of said recess is equal to said diameter of said control shaft so that when said engaging portions of a selected actuating member are engaged by said extremity of said control cam and by said bottom of said recess, respectively, in one of said control positions of said control cam, the respective actuating member is in said operative position.

11. Transmission control device as claimed in claim 10 wherein all diametrically opposite points of said control cam and of said bottom of said recess are spaced the same distances in a plane perpendicular to the axis of said control shaft.

12. Transmission control device as defined in claim 10 wherein said actuating members are disposed adjacent each other in axial direction of said control shaft and have an axial thickness equal to the pitch of said threaded means; wherein said engaging portions have half the axial thickness of said actuating members and are staggered in axial direction half said axial thickness of said actuating members; and wherein the axial thickness of said control cam is at least equal to said axial thickness of said actuating members so that said control cam is partly located in the cutout of an actuating member in said operative position engaging one of said engaging portions and partly located in the cutout of the adjacent actuating member in said inoperative position without engaging the respective staggered engaging portion of the same.

13. Transmission control device as defined in claim 12 wherein said axial recess has an axial width at least twice the axial thickness of each actuating member.

14. Transmission control device as defined in claim 2 and including a first housing for said transmission; and a second housing for said transmission control device, said housings being adapted to be filled with oil and having communicating openings through which said actuating members project from said second housing into said first housing.

15. Transmission control device as defined in claim 1 comprising a motor, and coupling means coupling said motor with said control shaft for turning movement, and for relative axial movement.

16. Transmission control device as defined in claim 1 and comprising a plurality of switch means axially spaced from each other; and a switch actuator on said control shaft engaging said switch means, respectively, in said axially and angularly displaced control positions.

References Cited

UNITED STATES PATENTS

| 1,136,526 | 4/1915 | Henderson | 74—337.5 |
| 2,538,625 | 1/1951 | Moore | 74—337.5 |
| 2,755,678 | 7/1956 | MacDonald | 74—337.5 |
| 2,755,679 | 7/1956 | Nallinger | 74—337.5 |

DONLEY J. STOCKING, *Primary Examiner.*

HENRY S. LAYTON, *Assistant Examiner.*